(12) United States Patent
Deshpande

(10) Patent No.: US 9,767,396 B2
(45) Date of Patent: Sep. 19, 2017

(54) INK SET OPTIMIZATION

(71) Applicant: Multi Packaging Solutions UK Limited, Nottingham (GB)

(72) Inventor: Kiran Deshpande, Leicester (GB)

(73) Assignee: Multi Packaging Solutions UK Limited, Nottingham (GB)

( * ) Notice: Subject to any disclaimer, the term of this patent is extended or adjusted under 35 U.S.C. 154(b) by 0 days.

(21) Appl. No.: 14/716,442

(22) Filed: May 19, 2015

(65) Prior Publication Data
US 2015/0339552 A1 Nov. 26, 2015

(30) Foreign Application Priority Data

May 20, 2014 (GB) .................................. 1408933.8

(51) Int. Cl.
*G06K 15/02* (2006.01)
*G06K 15/00* (2006.01)
*G01J 3/46* (2006.01)
*H04N 1/54* (2006.01)

(52) U.S. Cl.
CPC .......... *G06K 15/1867* (2013.01); *G01J 3/462* (2013.01); *G01J 3/463* (2013.01); *G06K 15/407* (2013.01); *H04N 1/54* (2013.01)

(58) Field of Classification Search
CPC ... G06K 15/1867; G06K 15/407; G01J 3/462; G01J 3/463; H04N 1/54
USPC .......... 358/1.9, 504, 509, 1.4, 518; 382/162, 382/167
See application file for complete search history.

(56) References Cited

U.S. PATENT DOCUMENTS

| 7,110,142 B2 * | 9/2006 | Mestha ................ H04N 1/6033 358/1.9 |
| 2005/0083346 A1 * | 4/2005 | Takahashi ............ H04N 1/6033 345/600 |
| 2005/0083540 A1 * | 4/2005 | Hersch ................ H04N 1/6025 358/1.9 |
| 2005/0150411 A1 | 7/2005 | Bestmann |
| 2009/0161125 A1 | 6/2009 | Mestha et al. |
| 2012/0090488 A1 | 4/2012 | Postle et al. |
| 2012/0099157 A1 | 4/2012 | Wurster et al. |

(Continued)

FOREIGN PATENT DOCUMENTS

| EP | 1973335 A2 | 9/2008 |
| GB | 2435572 A | 8/2007 |

OTHER PUBLICATIONS

Search report for GB1408933.8 dated Oct. 21, 2015.
(Continued)

*Primary Examiner* — Quang N Vo
(74) *Attorney, Agent, or Firm* — O'Shea Getz P.C.

(57) ABSTRACT

A method of selecting optimal inks from a plurality of ink candidates for a given color is provided, said method including a) obtaining a measure of spectral reflectance of a print substrate; b) obtaining a measure of the spectral reflectance of a first candidate ink of a first color; c) predicting a color gamut for the first candidate ink based on the spectral reflectance of the ink and the spectral reflectance of the substrate; d) repeating steps b) and c) for a second ink candidate of the first color; e) selecting the ink candidate for which the predicted color gamut includes the most target spot colors as the optimal ink for the first color.

2 Claims, 6 Drawing Sheets

(56) References Cited

U.S. PATENT DOCUMENTS

2013/0071023 A1* 3/2013 Sasaki ............... H04N 1/6016
　　　　　　　　　　　　　　　　　　382/167

OTHER PUBLICATIONS

Search report for EP15166738.3 dated Oct. 19, 2015.
Stollnitz et al. "Reproducing Color Images Using Custom Inks", ACM, Jan. 1, 1998.

* cited by examiner

Flowchart for ink selection algorithm

Flowchart for assigning colour-sectors to each ink

Flowchart for gamut prediction

Find if a target spot colour is inside the colour gamut

Example of implementing the ink selection algorithm for ECG printing process

INK SET OPTIMIZATION

This application is entitled to the benefit of, and incorporates by reference essential subject matter disclosed in United Kingdom Application No. 1408933.8 filed on May 20, 2014.

BACKGROUND OF THE INVENTION

1. Technical Field

The present invention is concerned with selecting optimal ink sets for an Expanded Color Gamut (ECG) printing process.

2. Background Information

Traditionally in printing, three or four inks have been used in printing apparatus. A three-ink printing device uses cyan, magenta and yellow inks (CMY). A four-ink printer adds black in to the basic CMY system to achieve deeper shadow tones and this is known as a CMYK system.

This combination of four inks can be used to produce other colors, for example, red, orange, green or blue/violet by overprinting some of the CMYK inks on top of each other.

Whilst this combination of inks has been toured to be effective in producing a wide color range, or "color gamut", the gamut of colors available to a four-ink printer is restricted by the properties of the four color inks.

As Desktop Color Publishing Systems become more ubiquitous, 4-colour CMYK (cyan, magenta, yellow, black) printing has become a commodity item. Consequently the technical community is being driven by the high-end color market to develop new printing technologies to differentiate and add value to their product. The intent is to produce images of superior color, tone and detail than is obtainable with traditional processes. One approach to obtaining more colorful images is by employing more than 4 inks as process inks; in short, extra-quaternary printing processes.

To meet the demands of very high quality printing, for example in packaging, systems have been developed that add additional color inks (process inks) such as orange, green and violet or red, green and blue to the base set of inks. For example, the system addresses the problems of available cyan, magenta and yellow colorants failing to render bright and saturated orange and green colors by using additional colorants that specifically target blue, orange and green portions of the visible spectrum. While this method is expensive, since it requires the use of additional printing stations to print these additional colorants, the solution is common in the packaging industry, where bright and saturated colors support the sale of a product.

The addition of colors to the traditional CMYK system is known as the Expanded Color Gamut (ECG) printing process. This process is sometimes also known as High Fidelity (Hi-Fi) color printing or N-color printing.

Augmenting a set of CMYK inks with additional inks increases the gamut of printable colors. In any printing process, colors tend to become darker as more ink is laid down on paper because of the subtractive interaction of ink and incident light. The lighter hues of red, green and blue are consequently difficult to achieve with the traditional set of CMYK primary inks since they are produced from 2-ink overprints of the primaries. These lighter hues can be obtained by single inks properly formulated to the desired hue. Additional inks tend to increase the color gamut in the darker tonal regions as well. Their presence chromatically expands the entire gamut up and down the tonal range. The quarter tones and 3 quarter tones are especially augmented.

The additional color inks are pre-mixed. Variations exist, though, in different batches of, e.g., orange, green or violet color. For example, one manufacturer's "orange" may be slightly different from another manufacturers "orange". Often, therefore, several possible inks are available to produce, effectively, the same additional color and a selection of the optimum ink sets has to be made.

Selection of these process-inks is crucial because it will affect the color gamut of the printing system resulting in success or failure of the ECG printing implementation.

Typically in packaging, the ECG printing is aimed at replacing the spot colors (and the special inks associated with these spot colors) with a fixed set of process inks. There are several inks available as candidates for process inks to choose from, particularly for Orange, Green and Violet. It is difficult to select the best ink-set from these available inks. For each possible combination of ink-set, it is necessary to find out the color gamut, which enables the coverage of spot colors to be checked, i.e. how many of the spot colors can be achieved and replaced by using the given combination of ink-set. It is not feasible to characterize all combinations to calculate a color gamut for each potential ink-set.

It is not practical to derive gamuts of all potential combinations of ink-sets for the ECG printing press. For example, if there are 200 ink-candidates for three process-inks (Orange, Green and Violet), then there are more than 1 million potential combinations of ink-sets for the ECG printing. Traditionally, it would be necessary to perform more than 1 million press-trials in order to derive a color gamut for each combination.

This traditional method requires long "make-ready times" (wash-up), long down times for the printing press, significant material wastage, and requires a large supply of special inks. The present invention aims to simplify selecting optimum ink sets for the expanded color gamut (ECG) printing process without having to print color test charts or overprints of inks on the printing press or printing device. The invention enables selection of an optimum ink set to replace a maximum number of spot colors with a set of, for example, seven inks.

SUMMARY OF THE INVENTION

According to one aspect of the present invention, there is provided a method of selecting optimal inks from a plurality of ink candidates for a given color, said method comprising: a) obtaining a measure of spectral reflectance of a print substrate; b) obtaining a measure of the spectral reflectance of a first candidate ink of a first color; c) predicting a color gamut for the first candidate ink based on the spectral reflectance of the ink and the spectral reflectance of the substrate; d) repeating steps b) and c) for a second ink candidate of the first color; e) selecting the ink candidate for which the predicted color gamut includes the most target spot colors as the optimal ink for the first color.

The method may be used to select from any number of ink candidates for the first color and also to select optimal ink candidates, in the same way, for a second color and, if desired for further colors.

In a more preferred embodiment, the method involves selecting a base ink set comprising two or more of the ink colors cyan (C), magenta (M), yellow (Y) and black (K), and selecting one or more additional inks to expand the color gamut of the base ink set using the above method steps to select optimal additional inks from a plurality of ink candidates. In the preferred method for each ink candidate for each additional ink, step b) involves predicting a color gamut for that ink candidate together with the inks of the base ink set based to generate a sub-gamut.

Most commonly, the base ink set will comprise CMY inks or, as is now commonplace, CMYK inks. The expanded color gamut is obtained by adding to these four process inks, one or more additional process inks, for example red (R), blue (B), orange (O), green (G) and/or violet (V).

The color gamut of the base ink set may be known, e.g. from traditional test-sheet testing or from manufacturer information or may be predicted in the same way as for the additional colors, based on the spectral reflectance of the inks and the substrate. If more than one base ink set is available, the ink set with the greatest number of spot colors within its gamut should be selected.

The spectral reflectance may be obtained from e.g. manufacturer information or may be measured by providing an ink draw-down on the substrate and measuring spectral reflectance using e.g. spectrophotometry.

In a preferred embodiment CIELAB values for the ink candidates may also be obtained and used to filter out colors of lower chroma—e.g. "grey" or "neutral" colors.

Preferably, to predict the color sub-gamut, each ink candidate—after filtering out grey or neutral candidates if appropriate, is assigned to a color sector. This may be done based on CIELAB measurements or hue analysis. The candidate can then be combined with the base set inks by substituting the opposing color of the base set.

In the most preferred embodiment, the sub-gamuts are predicted using a combination of the Kubelka-Munk model and the Yule-Nielsen modified spectral Neugebauer model (described below).

According to another aspect, there is provided a system comprising: means for obtaining a measure of spectral reflectance of a print substrate; means for obtaining a measure of the spectral reflectance of a first candidate ink of a first color; means for predicting a color gamut for the first candidate ink based on the spectral reflectance of the ink and the spectral reflectance of the substrate; means for obtaining a measure of spectral reflectance of a second candidate ink of the first color; means for predicting a color gamut for the second candidate ink based on the spectral reflectance of the ink and the spectral reflectance of the substrate; and means for selecting the ink candidate for which the predicted color gamut includes the most target spot colors as the optimal ink for the first color.

BRIEF DESCRIPTION OF THE DRAWINGS

Preferred embodiments of the invention will now be described with reference to the drawings, wherein.

DETAILED DESCRIPTION

In summary, the present invention selects optimum ink sets to maximize the coverage of given spot colors by predicting a color gamut of each potential combination of inks without having to print any color test chart on the printing press or device. This method can be iterated to derive multiple ink sets to replace more spot colors which are not achievable with the best ink set. All that is required is to draw a sample of or obtain spectral reflectance values for each possible ink onto a given substrate to calculate color gamuts for all combinations of ink sets.

A typical ECG printing process consists of seven process-inks—Cyan (C), Magenta (M), Yellow (Y), Black (K), Orange (O), Green (G) and Violet (V). Orange and Violet inks are sometimes replaced by Red and Blue inks respectively. This invention is applicable to any ECG printing process, especially those using up to seven colors, for example, five-color and six-color print process. Implementation for the seven-color ECG printing process is described below by way of example only. Similar procedures can be inferred for a reduced number of primaries like five or six process-inks.

A colorant space of the ECG printing process is divided into sub-sets of 4-dimensional printing processes. For a seven-color ECG printing process, there are four sub-sets, also called as color-sectors: CMYK, OMYK, CGYK and CMVK. Black is common across all sub-sets whereas each of the chromatic colors (C, M and Y) are replaced by their complementary colors (O, G and V respectively). (Reference U.S. Pat. No. 8,054,504 B2 by Marc Mahy and Francis Verbeeck). Each of these sub-sets of four inks has a color gamut, which will be called a sub-gamut. Full color gamut of the ECG printing process can be calculated by adding the gamuts of all sub-sets of four inks.

As mentioned above, a color gamut is typically calculated by printing a gamut test-chart and measuring the CIELAB values of all patches in the chart. A gamut test-chart chart consists of many patches defining the colorant values (like C, M, Y and K), for example, IT8.7/4 target (ISO 12642-2). It is impractical to print this test-chart for all combinations of ink-candidates, the present invention offers a gamut prediction method without printing such a gamut test-chart or any overprints of inks.

Figure 3:
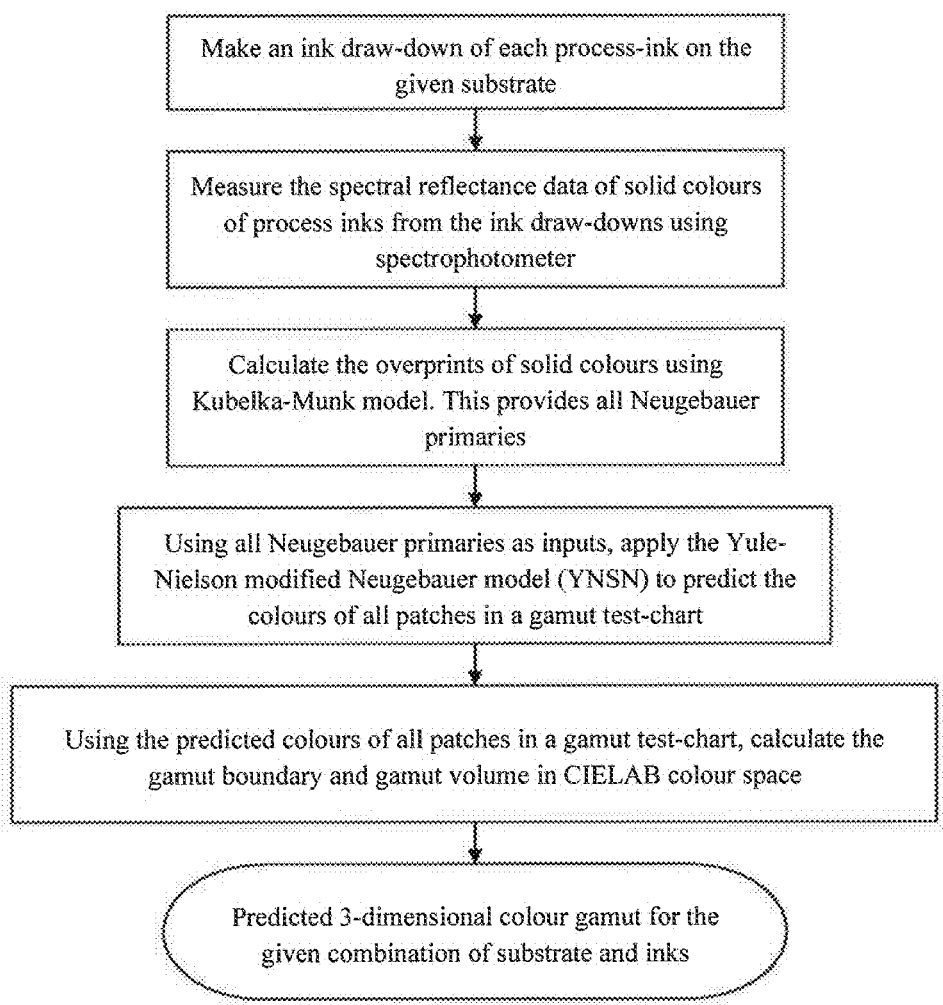
FIG. 3 is a flow chart for predicting color gamuts for use in an embodiment of the invention.

A color gamut of any color-sector consisting of four inks may be predicted, in one example using a flowchart as shown in FIG. 3. This provides a unique way of predicting a gamut with the combination of two spectral models (Kubelka-Munk and Yule-Nielsen modified Spectral Neugebauer) to predict the CIELAB values of all patches in a gamut test-chart without printing this chart.

According to the present invention, a base set—e.g. a CMY or CMYK ink set is first selected and process inks of this ink set (C, M, Y and K) are then used for deriving the optimum additional inks e.g. orange (O), green (G) and/or violet (V). All available special inks, for example, Pantone inks or bespoke special inks are treated as ink-candidates for the extended colors, in this example O, G and V.

A substrate could be paper, but it could also be for example textile, a synthetic foil or a metal plate on which colorant is laid down by an output device.

An output device means a hardware device that is capable of rendering images. In the preferred embodiments of the present invention, rendering and printing both refer to the process of rendering an image on an output device, whatever its nature. An output system is a system that includes an output device, but typically also software and hardware peripherals to operate the device, such as printer drivers, color correction and digital halftoning software and the systems they run on. In the preferred embodiments of the present invention, the rendering of color by an output device or system will be referred to as a process.

Output devices include display and printing devices. Examples of display devices include CRTs, LEDs, plasma and projection displays. Most of these devices can render both static and motion pictures. Examples of printing technologies include printers for photographic paper, electrophotographic printers, thermal transfer printers, dye sublimation printers, ink jet printers, offset printers, gravure printers and flexographic printers.

An output device can be monochrome or color, depending on its capabilities to render monochrome or color images.

Figure 1:
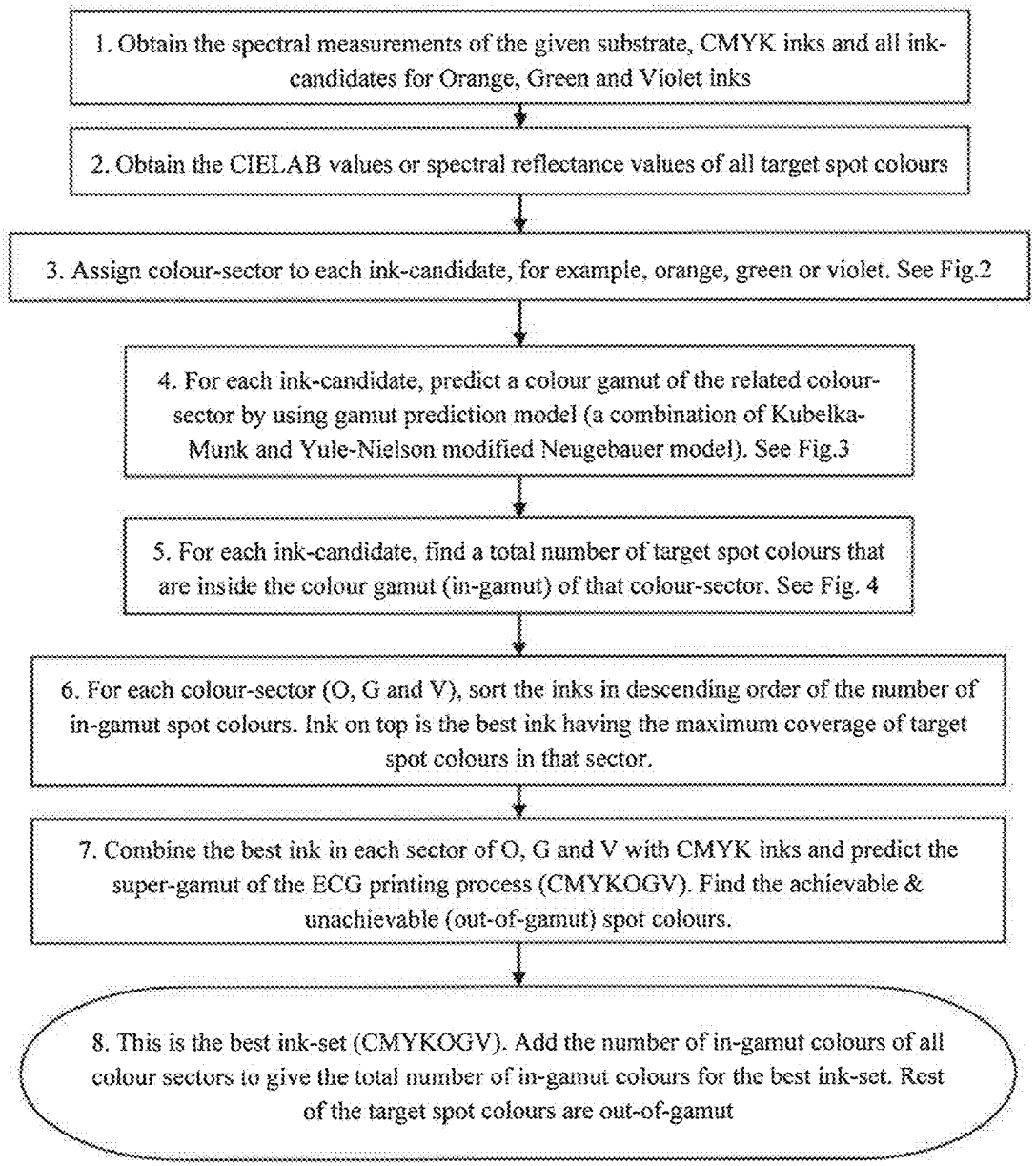
FIG. 1 is a flowchart for an ink selection algorithm in accordance with embodiments of the invention.

The present invention is described below using a seven color ECG printing process by way of example only, but the inventive method is applicable to combinations of any number of inks. (See FIG. 1)

The first step requires selection of a base, e.g. CMYK ink-set

If there is only one CMYK ink-set available, then it will be used as is for the rest of the ink-selection process. A sub-gamut of this CMYK ink-set is derived (see FIG. 3) and the number of target colors inside this sub-gamut is calculated (see FIG. 4). These in-gamut spot colors can be discarded from the further ink-selection algorithm since they can be achieved by the CMYK ink-set.

If there are multiple ink-sets of CMYK, then the ink-set which covers maximum number of target spot colors is selected as the best ink-set as follows. A gamut of each CMYK ink-set may be known or can be predicted using a gamut prediction process (see FIG. 3). For each ink-set, the number of target spot colors inside the gamut can be calculated. This can be done as follows: for each target spot color, check if it is inside the gamut (see FIG. 4), create a list of all in-gamut colors and calculate the total number of colors in this list. Thus, each CMYK ink-set will have a total number of in-gamut colors. The ink set having the highest number of in-gamut colors is selected as the best CMYK ink-set for the ECG printing process.

In a preferred embodiment, the target spot colors already covered by the CMYK color gamut can be discarded.

Figure 4:
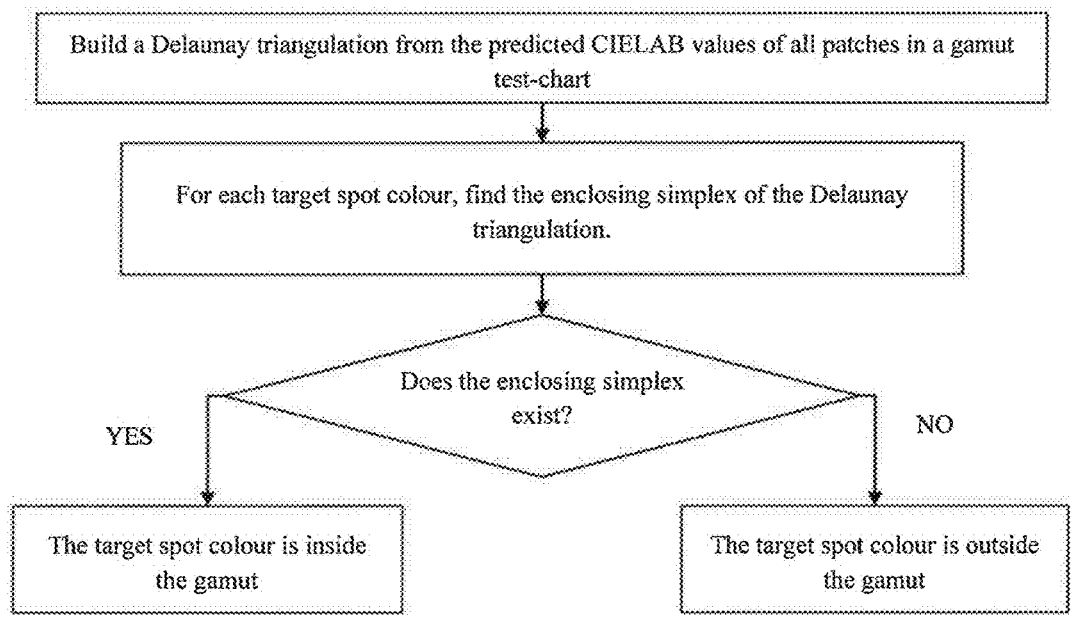
FIG. 4 is a flowchart of a method for determining if a target spot color is inside a color gamut, for use in embodiments of the invention.

The total number of target spot colors inside a gamut of the selected CMYK ink-set is calculated (see FIG. 4). Since these spot colors can be achieved and replaced using the CMYK ink-set, they can be discarded and the remaining spot colors are used as target spot colors for further ink-selection of O, G and V inks.

Figure 2:
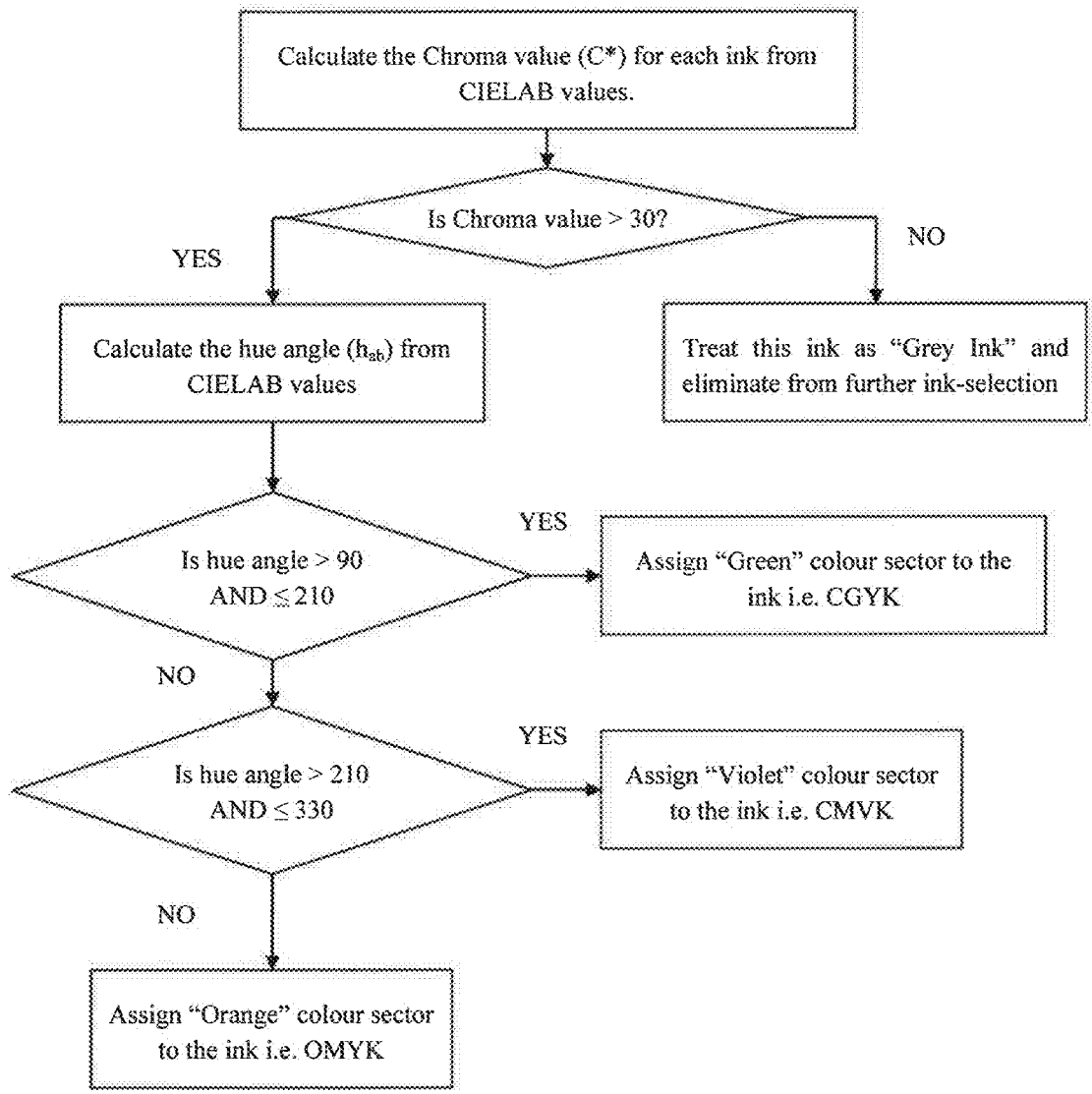
FIG. 2 is a flowchart for assigning color sectors to each ink, for use in an embodiment of the invention.

Selection of O, G and V inks involves, in the preferred embodiment, assigning a color-sector to each ink-candidate for O, G and V (see FIG. 2)

After selecting the CMYK ink-set, the next step is to derive the O, G and V inks. Spectral reflectance and CIELAB measurements of each ink-candidate are obtained. This can be done either by making an ink draw-down of each ink on the desired substrate and measuring the spectral reflectance and CIELAB data using a spectrophotometer or by obtaining the spectral reflectance data directly from the ink supplier.

First, the neutral or grey inks may be eliminated or filtered out. One way of doing this is as follows. For each ink-candidate, the chroma ($C_{ab}$) is calculated from a* and b* values of CIELAB:

$$C_{ab} = \sqrt{a^{*2} + b^{*2}} \qquad \text{Equation 1}$$

If the chroma ($C_{ab}$) of the given ink is less than e.g. 30, then this ink is treated as a neutral or grey ink. All such inks are eliminated from a list of ink-candidates.

In the preferred method of assigning inks to color sectors, for each ink-candidate of the filtered list, a hue angle ($h_{ab}$) is calculated from a* and b* values of CIELAB:

$$h_{ab} = \tan^{-1}\left(\frac{b}{a}\right) \qquad \text{Equation 2}$$

If $h_{ab} > 90$ and $h_{ab} \leq 210$, then the ink-candidate is assigned to Green color-sector and this ink is combined with C, Y and K inks to form CGYK sub-set.

If $h_{ab} > 210$ and $h_{ab} \leq 330$, then the ink-candidate is assigned to Violet color-sector and this ink is combined with C, M and K inks to form CMVK sub-set.

If $h_{ab} > 0$ and $h_{ab} \leq 90$ or $h_{ab} > 330$, then the ink-candidate is assigned to Orange color-sector and this ink is combined with M, Y and K inks to form OMYK sub-set.

The following will assume there are 'x' number of Orange inks, 'y' number of Green inks and 'z' number of Violet inks after assigning the color-sectors.

A color gamut of a sub-set for each ink-candidate is then predicted.

For each ink-candidate, a sub-gamut is predicted, for example using a method such as described in FIG. 3. This requires the spectral reflectance measurements of the substrate and those of the four (in this example) inks associated with that color-sector. For example, for an ink in Orange sector, a sub-gamut is predicted for the OMYK color-sector using M, Y and K inks from the base or CMYK ink-set. This may be done by predicting CIELAB values of all patches in a gamut test-chart and calculating the gamut boundary. (FIG. 3)

A total number of target spot colors that are inside the color gamut of the sub-set for each ink-candidate is then calculated In one method, the predicted CIELAB values of all patches in a gamut test-chart are used for building a Delaunay triangulation. For each target spot color, if there exists an enclosing simplex of the Delaunay triangulation, then the spot color is inside the gamut. Otherwise it will be outside the gamut. The same process is repeated for all spot colors and the total number of spot colors that are inside the sub-gamut for the given ink-candidate is calculated.

For each color-sector (O, G and V), it is then possible to derive the best ink that has the maximum number of in-gamut spot colors.

Assuming there are 'x' number of Orange inks, 'y' number of Green inks and 'z' number of Violet inks after assigning the color-sectors, for Orange color-sector (OMYK), there are 'x' predicted sub-gamuts, each of them represented by single ink-candidate. Each sub-gamut or ink-candidate is associated with a total number of in-gamut or achievable spot colors. For example, 'OrangeInk1' with 65 in-gamut spot colors, 'OrangeInk2' with 78 in-gamut spot colors and so on.

Similarly, Green color-sector (CGYK) and Violet color-sector (CMVK) have 'y' and 'z' sub-gamuts respectively each associated with a total number of in-gamut spot colors.

For each color-sector, the ink-candidates may be sorted in descending order of the total number of in-gamut spot colors. Thus 'x' inks in orange color-sector are sorted starting from the ink-candidate with maximum in-gamut spot colors towards the ink-candidate with minimum in-gamut spot colors. The best Orange ink is now at the top of the list having maximum coverage of target spot colors. If there are multiple Orange inks resulting in maximum coverage of spot colors, then the ink-candidate with the highest chroma ($C_{ab}$) is selected as the best ink that color sector. For example, if 'OrangeInk2' and 'OrangeInk3' have maximum coverage of spot colors (say 78 in-gamut spot colors) and their chroma is 89 and 92 respectively, then 'OrangeInk3' is selected as the best ink because of its higher chroma. Alternatively, the best ink-candidates may be selected without sorting into lists.

The best Green ink and the best Violet ink is derived using a similar process.

The best inks in each color-sector can be combined with the CMYK ink-set to form the optimum ink-set for the ECG printing process.

The best inks from color-sector of O, G and V are combined with CMYK inks. These seven inks (CMYKOGV) represent the optimum ink-set for the ECG printing process to replace maximum spot colors from target library.

It is additionally possible to calculate the color gamut of the ECG printing process by adding sub-gamuts of all color-sectors For the optimum ink-set, there are four color-sectors—CMYK, OMYK, CGYK and CMVK. For each color-sector, the predicted CIELAB values of all patches in a gamut test-chart are obtained. All CIELAB values from all four color-sectors are combined to form a super-set. Gamut boundary of this super-set of CIELAB values is calculated (FIG. 3). This represents the full color gamut of the ECG printing process. The total number of target spot colors inside this color gamut is calculated using the same process shown in FIG. 4. Other spot colors are outside the gamut, and cannot be replaced by the selected ink-set.

To replace the maximum number of out-of-gamut spot colors, the ink-selection algorithm can be iteratively used by making the out-of-gamut colors as a new set of target spot colors keeping all ink-candidates the same. The CMYK ink-set remains the same, but O, G and V inks may change. Typically the iterations produce diminishing returns. For example, if the optimum ink-set (say ink-set1) covers 80% of the total target spot colors (i.e. 20% spot color are outside the gamut of the best ink-set) then the next iteration will use the out-of-gamut spot colors (20%) as the target; the next ink-set (say ink-set2) may cover only 50% of its target, but both ink-sets (ink-set1 and ink-set2) together now cover 90% of the original target spot colors.

Figure 5:
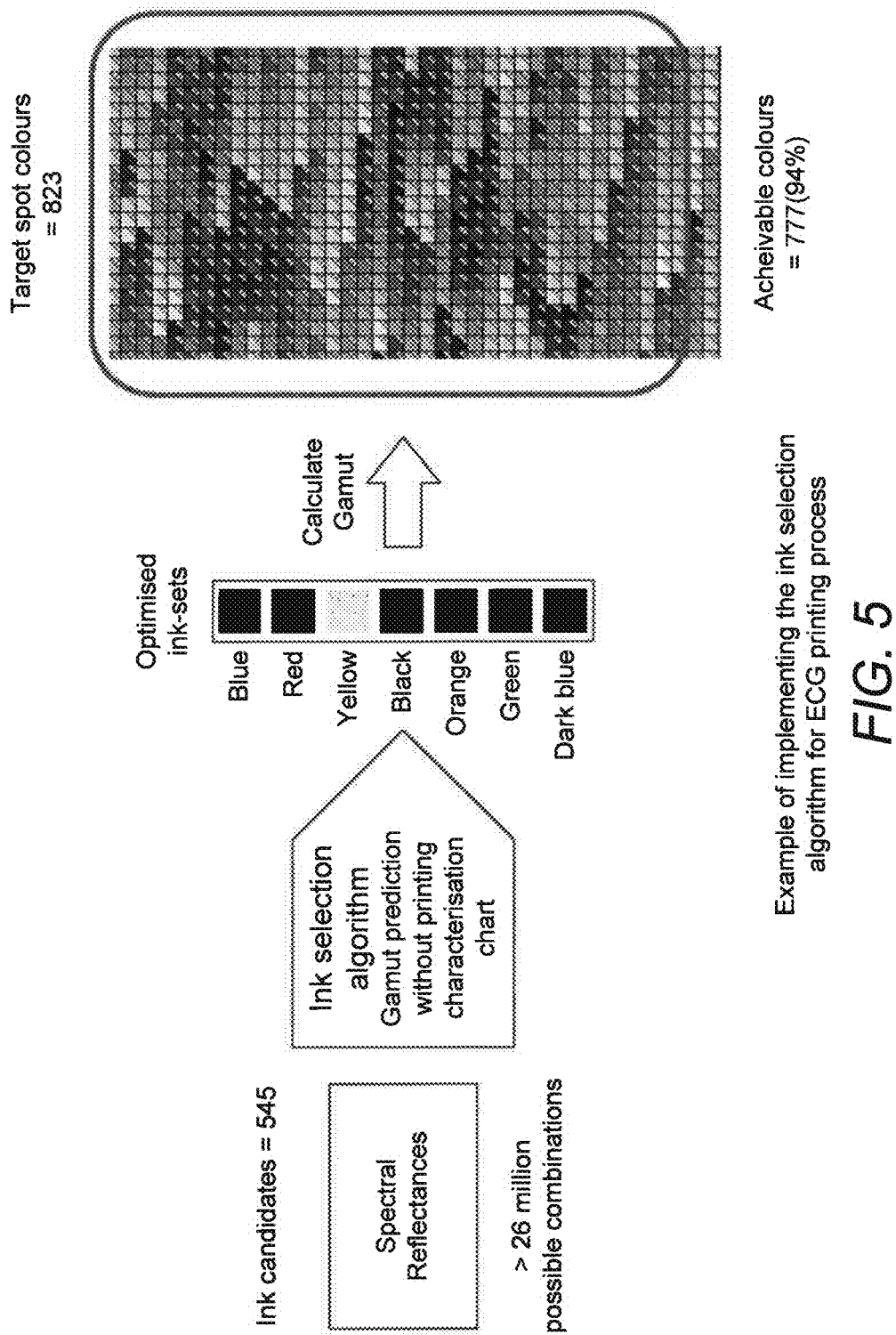
FIG. 5 shows an example of implementing the ink selection algorithm for an ECG printing process.

FIG. 5 shows a real-life example of implementing the ink selection algorithm for the ECG printing process.

Gamut Prediction (see FIG. 3)

Gamut prediction plays a crucial role in ink-selection. The preferred embodiment of the present invention uniquely combines two spectral printer models (Kubelka-Munk and Yule-Nielsen modified Spectral Neugebauer) for predicting a color gamut of ECG printing process without printing and measuring a gamut test-chart. This method is described below.

Inputs required for the gamut prediction method are as follows:
  spectral reflectance measurements of the given paper or other substrate
  spectral reflectance measurements of all process inks (for example, CMYK)

The above mentioned inputs are used for the Kubelka-Munk (KM) model for calculating all possible overprints. These overprints along with the above mentioned inputs form the Neugebauer Primaries, which are used as inputs for the Yule-Nielsen modified Spectral Neugebauer (YNSN) model. The YNSN model is then used for predicting all colors in the gamut test-chart to calculate the gamut boundary.

Figure 6:
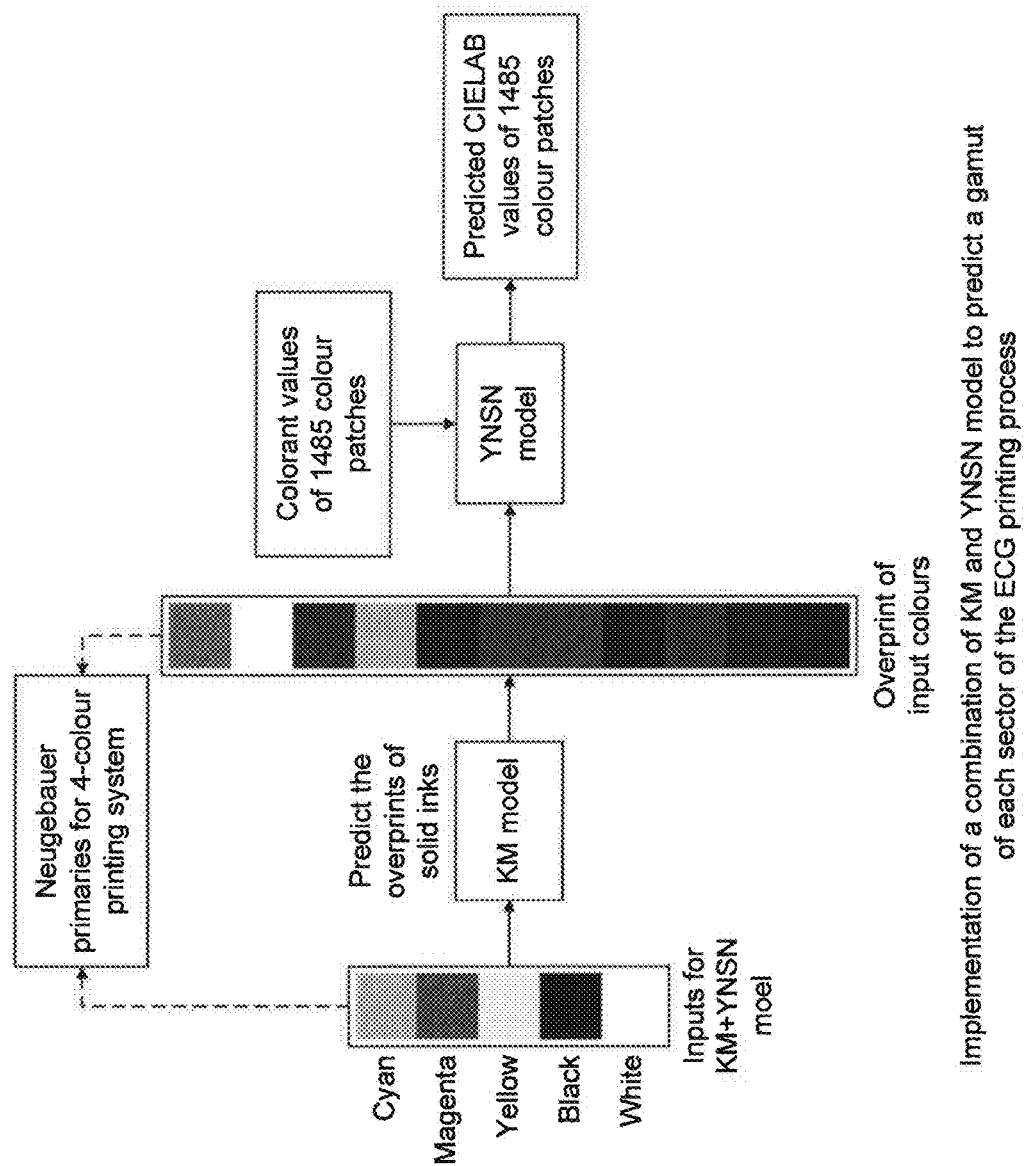
FIG. 6 is an example of implementing a combination of KM and YNSN models to predict a gamut for each sector for an ECG printing process in accordance with an embodiment of the invention.

For example, in case of CMYK color-sector, there are five inputs (see FIG. 6): spectral measurements of the substrate and four process inks. The KM model can accept these inputs to calculate the spectra of following overprints: C+M, C+Y, C+K, M+Y, M+K, Y+K, C+M+Y, C+M+K, C+Y+K, M+Y+K, C+M+Y+K.

The predicted overprints (11) and the original inputs (5) become the Neugebauer primaries (16) for the CMYK color-sector. These 16 Neugebauer Primaries are used as inputs for the YNSN model. If ECI2002 test-chart (with 1485 color patches) is used as a gamut test-chart, then each color in this test-chart can be predicted using the YNSN model. All predicted colors (1485) are then used for calculating gamut boundary in the CIELAB color space.

1. Kubelka-Munk (KM) Model

A) Calculate a Single-Constant K/S Ratio for Each Process-Ink

The Kubelka-Munk model (Kubelka, 1954) predicts the absorption and scattering of the light in colorant. A ratio of the absorption coefficient (K) and the scattering coefficient (S) is considered as a single-constant, which can be calculated for each process-ink from the spectral reflectance measurement of the given process-ink as follows:

$$\left(\frac{K(\lambda)}{S(\lambda)}\right)_i = \frac{(1 - R_i(\lambda))^2}{2R_i(\lambda)} \quad \text{Equation 3}$$

$\left(\frac{K(\lambda)}{S(\lambda)}\right)_i$ = single-constant ratio of the $i$-th process ink (for example, Cyan)

$K(\lambda)$=absorption coefficient
$S(\lambda)$=scattering coefficient
$R_i(\lambda)$=measured spectral reflectance of the i-th process ink The same equation is used for calculating the single-constant K/S ratio for the substrate from its spectral reflectance measurement.

B) Calculate a Single-Constant K/S Ratio for Each Overprint of Process-Inks

The individual K/S ratios are then used to calculate the K/S ratio of each overprint, for example, C+M. The single-constant K/S ratio of each overprint is calculated as follows:

$$\frac{K(\lambda)}{S(\lambda)} = \left(\frac{K(\lambda)}{S(\lambda)}\right)_p + c_1\left(\frac{K(\lambda)}{S(\lambda)}\right)_1 + c_2\left(\frac{K(\lambda)}{S(\lambda)}\right)_2 + c_3\left(\frac{K(\lambda)}{S(\lambda)}\right)_3 + c_4\left(\frac{K(\lambda)}{S(\lambda)}\right)_4 \quad \text{Equation 4}$$

$\left(\frac{K(\lambda)}{S(\lambda)}\right)_p$ = single-constant ratio of the paper (substrate)

$\left(\frac{K(\lambda)}{S(\lambda)}\right)_i$ = single-constant ratio of the $i$-th process ink (for example, Cyan)

$c_i$=concentration of the i-th process ink

C) Calculate the Spectral Reflectance of Each Overprint from its K/S Ratio

The spectral reflectance of each overprint (for example, C+M) is calculated from its K/S ratio as follows:

$$R(\lambda) = 1 + \frac{K(\lambda)}{S(\lambda)} - \sqrt{\left(\frac{K(\lambda)}{S(\lambda)}\right)^2 + 2\left(\frac{K(\lambda)}{S(\lambda)}\right)} \quad \text{Equation 5}$$

R(λ)=predicted spectral reflectance of the overprint $$\frac{K(\lambda)}{S(\lambda)} = \text{single-constant ratio of overprint}$$

K(λ)=absorption coefficient
S(λ)=scattering coefficient

Once the spectral reflectances for all overprints (total of 11) are predicted, they are combined with the spectral reflectance measurements of original inputs (5) to form the Neugebauer Primaries.

2. Yule-Nielsen Modified Spectral Neugebauer (YNSN) Model

Spectral reflectance values for each patch of the gamut test-chart can be calculated using the spectral reflectance of each Neugebauer Primary as follows (Viggiano, 1990):

$$R(\lambda)^{(1/n)} = \sum_{i=0}^{N} w_i R_i(\lambda)^{(1/n)} \qquad \text{Equation 6}$$

R(λ)=predicted spectral reflectance
N=number of Neugebauer Primaries
$R_i(\lambda)$=spectral reflectance measurement of i-th Neugebauer primary
$w_i$=fractional dot area of the i-th Neugebauer primary
n=Yule-Nielsen factor The Yule-Nielsen factor (n) can be optimized by printing few overprints and comparing their spectral measurements with the predicted spectra of KM model. A typical criterion used for optimization is minimizing the color difference value between the predicted and the measured spectra. In the absence of the optimized value of the Yule-Nielsen factor, the following values of Yule-Nielsen factor can be used for different printing processes:

Offset printing process: 2.0
Flexography and Gravure printing processes: 2.2
Inkjet printing process: 1.5
Thermal sublimation printing process: 2.4

Deriving Gamut Boundary and Gamut Volume in CIELAB Color Space

A color gamut of any printing system is usually determined by printing a gamut test-chart and measuring the CIELAB values of all patches in the chart with a spectrophotometer. A gamut test-chart chart consists of many patches defining the colorant values (like C, M, Y and K), for example, IT8.7/4 target (ISO 12642-2). The CIELAB values of all patches are used for deriving a color gamut boundary and calculating a gamut volume.

To calculate a volume of the color gamut, coordinates of colors on a gamut boundary are determined by using existing methods, for example, finding a convex-hull containing all colors.

A surface triangulation is applied using a set of triangles which completely covers the gamut, for example n-dimensional Delaunay triangulation. A list of triangle faces is generated. From this list, a set of tetrahedra that fill the gamut volume is determined. The volume of each individual tetrahedron is calculated using the general formula.

$$V = \frac{1}{6}|a \cdot (b \times c)| \qquad \text{Equation 7}$$

Where a, b and c are the edges corresponding to the three corners of the triangle on the gamut boundary. These edges meet at the center point of the gamut. Note that the term a·(b×c) is a scalar triple product.

Finally the total gamut volume is computed by summing up the volumes of all individual tetrahedra. If the CIELAB color space is used for calculating gamut then the unit of gamut volume is cubic CIELAB volume.

Using the gamut prediction of the present invention, it is possible to select optimal ink sets for expanded color gamut printing in a simple, efficient and effective manner.

What is claimed is:

1. A method of selecting an optimal additional ink from a plurality of ink candidates, the ink candidates associated with a given color sector based on a hue angle calculated from "a" and "b" values of CIELAB according to the equation $$h_{ab} = \tan^{-1}\left(\frac{b}{a}\right),$$

said method comprising:
selecting a base ink set comprising two or more of the ink colors cyan (C), magenta (M), yellow (Y) and black (K);
selecting an optimal additional ink from the plurality of ink candidates to expand a color gamut of the base ink set, using the following method steps:
a) obtaining a measure of spectral reflectance of a print substrate;
b) obtaining a measure of the spectral reflectance of a first candidate ink of a first color sector;
c) predicting a color gamut, comprising a gamut of target spot colors, for the first candidate ink based on the spectral reflectance of the ink, the spectral reflectance of the substrate, and the spectral reflectances of the ink colors from the base ink set also associated with that color sector;
d) repeating steps b) and c) for one or more further ink candidates of the first color sector; and
e) selecting the ink candidate for which the predicted color gamut includes the most target spot colors as the optimal ink for the first color sector.

2. A system comprising:
means for obtaining a measure of spectral reflectance of a print substrate;
means for obtaining a measure of the spectral reflectance of a first candidate ink of a first color sector;
means for predicting a color gamut, comprising a gamut of target spot colors, for the first candidate ink based on the spectral reflectance of the ink, the spectral reflectance of the substrate and the spectral reflectance of inks from a base ink set comprising two or more of the ink colors cyan (C), magenta (M), yellow (Y) and black (K) associated with the same color sector as the ink candidate;
means for obtaining a measure of spectral reflectance of one or more further candidate inks of the first color sector;
means for predicting a color gamut, comprising a gamut of target spot colors, for the one or more further candidate inks based on the spectral reflectance of the ink, the spectral reflectance of the substrate and the spectral reflectance of inks from a base ink set comprising two or more of the ink colors cyan (C), magenta (M), yellow (Y) and black (K) associated with the same color sector as the ink candidate; and means for selecting the ink candidate for which the predicted color gamut includes the most target spot colors as the optimal ink for the first color sector.

* * * * *